(12) United States Patent
Schachinger et al.

(10) Patent No.: US 12,276,537 B2
(45) Date of Patent: Apr. 15, 2025

(54) RADAR LEVEL GAUGE WITH ELASTIC SYSTEM

(71) Applicant: Rosemount Tank Radar AB, Mölnlycke (SE)

(72) Inventors: Peter Schachinger, Kullavik (SE); Stig Larsson, Sävedalen (SE); Lars-Ove Larsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 441 days.

(21) Appl. No.: 17/588,486

(22) Filed: Jan. 31, 2022

(65) Prior Publication Data

US 2022/0260406 A1 Aug. 18, 2022

(30) Foreign Application Priority Data

Feb. 12, 2021 (EP) .................................... 21156859

(51) Int. Cl.
*G01F 23/284* (2006.01)
*G01P 15/00* (2006.01)

(52) U.S. Cl.
CPC ............ *G01F 23/284* (2013.01); *G01P 15/00* (2013.01)

(58) Field of Classification Search
CPC .................................................... H01Q 1/225
See application file for complete search history.

(56) References Cited

U.S. PATENT DOCUMENTS 4,041,500 A 8/1977 Lapp
4,219,814 A 8/1980 Johnson
(Continued)

FOREIGN PATENT DOCUMENTS

CN 107272014 A 10/2017
DE 102007056329 A1 5/2009
(Continued)

OTHER PUBLICATIONS

Extended European Search Report from European Patent Application No. 21156859.7, dated Jul. 21, 2021.
(Continued)

*Primary Examiner* — Vladimir Magloire
*Assistant Examiner* — Eric K Hodac
(74) *Attorney, Agent, or Firm* — Westman, Champlin & Koehler, P.A.

(57) ABSTRACT

A radar level gauge system for determining a topographic property of a product, comprising a transceiver; a signal transfer element coupled to the transceiver and configured to emit an electromagnetic transmit signal from the transceiver in an emission direction; a propagating member for propagating the transmit signal towards the surface of the product and a reflection signal back towards the transceiver, the propagating member being movably arranged in relation to the signal transfer element and configured to deflect the transmit signal; an elastic system coupled to the signal transfer element and to the propagating member, and arranged to define at least one property of an oscillating movement of the propagating member in relation to the signal transfer element; an actuator arranged to initiate the oscillating movement; and processing circuitry coupled to the transceiver for determining the topographic property based on the transmit signal and the reflection signal.

13 Claims, 7 Drawing Sheets

(56) References Cited

U.S. PATENT DOCUMENTS

| | | | |
|---|---|---|---|
| 9,581,484 B2* | 2/2017 | Mayer | G01F 25/24 |
| 10,509,198 B1* | 12/2019 | Zhou | G02B 26/0841 |
| 2002/0018022 A1 | 2/2002 | Ishikawa et al. | |
| 2003/0214457 A1 | 11/2003 | Ishikawa et al. | |
| 2007/0028829 A1* | 2/2007 | Griessbaum | G01F 23/284 |
| | | | 114/343 |
| 2013/0220011 A1 | 8/2013 | Baer et al. | |
| 2015/0048963 A1 | 2/2015 | Dieterle | |
| 2016/0352009 A1 | 12/2016 | Tanaka | |
| 2017/0322072 A1* | 11/2017 | Wakita | G01H 9/00 |
| 2019/0107424 A1 | 4/2019 | Welle et al. | |

FOREIGN PATENT DOCUMENTS

| | | | | |
|---|---|---|---|---|
| DE | 102017124996 A1 * | 4/2019 | | H01Q 1/225 |
| EP | 2990823 A1 | 3/2016 | | |
| GB | 763805 A | 12/1956 | | |
| WO | 2017006524 A1 | 1/2017 | | |

OTHER PUBLICATIONS

European Communication pursuant to Article 94(3) EPC, for European Patent Application No. 22 153 199.9, dated Mar. 21, 2024, 8 pages.

\* cited by examiner

RADAR LEVEL GAUGE WITH ELASTIC SYSTEM

CROSS-REFERENCE TO RELATED APPLICATION

This application claims priority to European Patent Application No. 21156859.7, filed Feb. 12, 2021, the content of which is hereby incorporated by reference in its entirety.

TECHNICAL FIELD OF THE INVENTION

The present invention relates to a radar level gauge system and to a method of determining a topographic property of a product.

TECHNICAL BACKGROUND

Radar level gauge systems are in wide use for measuring filling levels in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe. The electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

While measuring the filling level of a liquid product may be rather straight-forward, it is more challenging to evaluate a solid product, because the surface of the product may be non-flat and/or non-horizontal. Therefore, the highest level of the solid product may not be directly below the antenna of a radar level gauge system of the non-contacting type.

In view of this characteristic of solid products, it is known to scan the transmit signal from the transceiver of the radar level gauge system across the surface of the product, either by mechanically tilting the antenna of the radar level gauge, or by directing the emitted beam using phase array techniques. US 2019/0107424 describes examples of both of these scanning methods.

However, both of these basic scanning methods have drawbacks. Mechanical tilting of the antenna requires a relatively costly and bulky mechanical arrangement, and phase array techniques may make it difficult to transmit sufficient power to get a reliable evaluation result.

SUMMARY

In view of the above, a general object of the present invention is to provide for improved determination of a topographic property of a product, in particular a solid product.

According to a first aspect of the present invention, it is provided a radar level gauge system for determining a topographic property of a product, the radar level gauge system comprising a transceiver for generating, transmitting and receiving electromagnetic signals; a signal transfer element coupled to the transceiver and configured to emit an electromagnetic transmit signal from the transceiver in an emission direction; a propagating member arranged and configured to propagate the transmit signal towards the surface of the product, and to propagate a reflection signal resulting from reflection of the transmit signal at the surface of the product back towards the transceiver, the propagating member being movably arranged in relation to the signal transfer element and configured to deflect the transmit signal from the signal transfer element to a plurality of different propagation directions, each propagation direction corresponding to a position of the propagating member in relation to the signal transfer element in a plane perpendicular to the emission direction; an elastic system coupled to the signal transfer element and to the propagating member, and arranged to define at least one property of an oscillating relative movement between the propagating member and the signal transfer element; an actuator arranged to initiate the oscillating movement; and processing circuitry coupled to the transceiver and configured to determine the topographic property based on the transmit signal and the reflection signal.

The "transceiver" may be one functional unit capable of transmitting and receiving electromagnetic signals, or may be a system comprising separate transmitter and receiver units.

It should be noted that the processing circuitry may be provided as one device or several devices working together.

The present invention is based upon the realization that various topographic properties of a solid product can be determined without detailed knowledge about the scanning direction at all times.

The present inventors have further realized that such scanning with only limited control of the scanning direction can be achieved in a cost-efficient and compact manner, without significantly reducing the transmitted power, by providing a propagating member that can redirect the transmit signal depending on the relative positioning of the propagating member and the signal transfer element, and providing for an oscillating relative movement between the signal transfer element and the propagating member.

Hereby, predictable scanning of the surface of the product can be achieved by simple and cost-efficient means. The scanning pattern across the surface of the product can be determined by selection of the properties of the elastic system. In embodiments, the elastic system may be configured to allow tuning of its properties, providing for tuning of the scanning pattern.

To prevent changes in in the beam shape of the transmit signal, the oscillating movement of the propagating member in relation to the signal transfer element may advantageously be restricted from taking place in the emission direction, so that the oscillating movement can substantially only take place in a plane perpendicular to the emission direction.

In embodiments where a two-dimensional scanning pattern is desired, the elastic system may define a first eigenfrequency of a first component of the oscillating movement and a second eigenfrequency, different from the first eigenfrequency, of a second component of the oscillating movement.

In embodiments, a first one of the signal transfer element and the propagating member may remain stationary and a second one of the signal transfer element and the propagating member may start to move, in relation to a tank where the radar level gauge system is installed, when the oscillating movement is initiated.

In embodiments, the radar level gauge system may further comprise a position indication arrangement arranged and configured to provide a signal indicative of instantaneous positions at different times during movement of the propagating member in relation to the signal transfer element. The processing circuitry may be coupled to the position indication arrangement and configured to determine the topographic property additionally based on the instantaneous positions of the propagating member in relation to the signal transfer element. Hereby, additional detail about the topography of the product can be determined. For instance, the position of the highest level of the product can be determined and/or the shape of the surface of the product can be determined, or at least estimated.

According to a second aspect of the present invention, it is provided a method of determining a topographic property of a product using a radar level gauge system comprising a transceiver; a signal transfer element coupled to the transceiver; a propagating member movably arranged in relation to the signal transfer element and configured to deflect an electromagnetic signal from the signal transfer element depending on a position of the propagating member in relation to the signal transfer element; an elastic system coupled to the signal transfer element and to the propagating member; an actuator; and processing circuitry coupled to the transceiver, the method comprising: generating, by the transceiver, an electromagnetic transmit signal; emitting, by the signal transfer element, the transmit signal in an emission direction; propagating, by the propagating member, the transmit signal towards a surface of the product; propagating, by the propagating member, a reflection signal resulting from reflection of the transmit signal at the surface of the product, back towards the transceiver; receiving, by the transceiver, the reflection signal; oscillating, by the elastic system and the actuator, one of the propagating member and the signal transfer member in relation to the other one of the propagating member and the signal transfer member in a plane perpendicular to the emission direction, while the transmit signal is propagated towards the surface of the product and the reflection signal is propagated back towards the transceiver; and determining, by the processing circuitry, the topographic property of the product based on a timing relation between the transmit signal and the reflection signal.

In summary, the present invention thus relates to a radar level gauge system for determining a topographic property of a product, comprising a transceiver; a signal transfer element coupled to the transceiver and configured to emit an electromagnetic transmit signal from the transceiver in an emission direction; a propagating member for propagating the transmit signal towards the surface of the product and a reflection signal back towards the transceiver, the propagating member being movably arranged in relation to the signal transfer element and configured to deflect the transmit signal; an elastic system coupled to the signal transfer element and to the propagating member, and arranged to define at least one property of an oscillating movement of the propagating member in relation to the signal transfer element; an actuator arranged to initiate the oscillating movement; and processing circuitry coupled to the transceiver for determining the topographic property based on the transmit signal and the reflection signal.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

Figure 1:
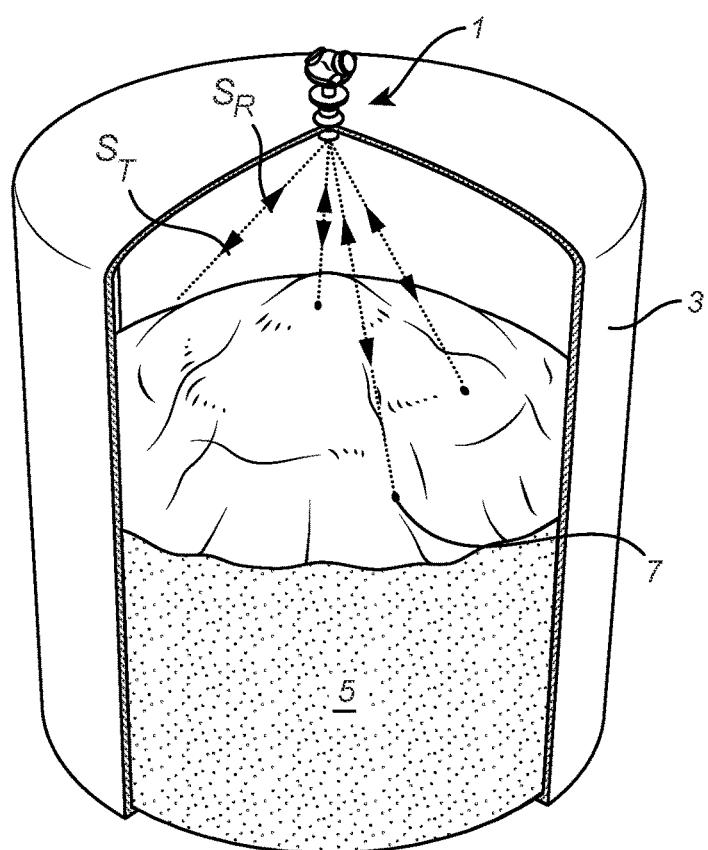
FIG. 1 schematically illustrates a radar level gauge system according to an example embodiment of the present invention installed at a tank containing a solid product.

FIG. 1 schematically illustrates a radar level gauge system 1 according to an example embodiment of the present invention installed at a tank 3 containing a solid product 5. As is schematically indicated in FIG. 1, the solid product 5 has a non-flat surface topography, and the radar level gauge system 1 is configured to determine a topographic property of the product 5, which may, for example, be a maximum, minimum or average level of the product 5.

To this end, the radar level gauge system 1 according to embodiments of the present invention is controllable to deflect the transmit signal $S_T$ to hit different locations 7 on the surface of the product 5. As is schematically indicated in FIG. 1, a reflection signal $S_R$ resulting from reflection of the transmit signal $S_T$ at the surface of the product 5 is returned to the radar level gauge system 1. This allows the radar level gauge system 1 to determine the distance to different positions on the surface of the product, which in turn allows determination of the above-mentioned topographic property.

Figure 2:
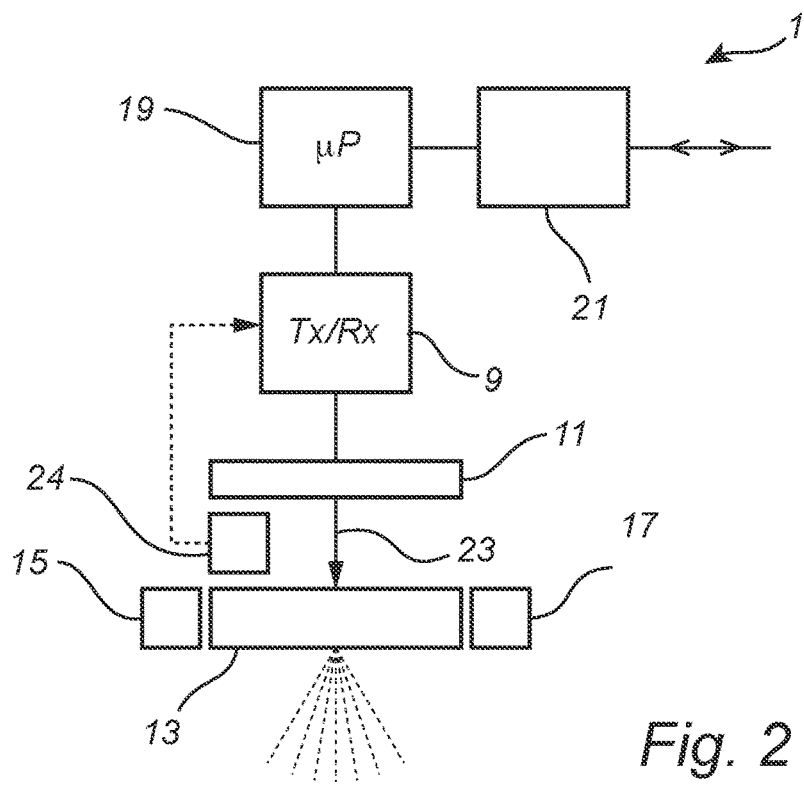
FIG. 2 is a schematic block-diagram of the radar level gauge system in FIG. 1.

Referring now to FIG. 2, which is a schematic block-diagram of the radar level gauge system 1 in FIG. 1, the radar level gauge system 1 comprises a transceiver 9, a signal transfer element 11, a propagation member 13, an elastic system 15, an actuator 17, processing circuitry 19, and a communication interface 21.

The transceiver 9 is configured to generate, transmit and receive electromagnetic signals, advantageously microwave signals, in a, per se, known manner. As will be well-known to one of ordinary skill in the relevant art, the transceiver may, for example, operate using pulsed signals and/or a frequency sweep.

The signal transfer element 11 is coupled to the transceiver 9 and configured to emit the above-mentioned transmit signal $S_T$ in an emission direction 23. The signal transfer element 11 may also capture the reflection signal $S_R$ and provide the reflection signal $S_R$ to the transceiver 9.

The propagating member 13 is arranged and configured to propagate the transmit signal $S_T$ towards the surface of the product 5 and to propagate the reflection signal $S_R$ back towards the transceiver 9, via the signal transfer element 11. The propagating member 13 is movably arranged in relation to the signal transfer element 11, and is configured to deflect the transmit signal $S_T$ from the signal transfer element 11 to a plurality of different propagation directions, each propagation direction corresponding to a position of the propagating member 13 in relation to the signal transfer element 11 in a plane perpendicular to the emission direction 23.

The elastic system 15 is coupled to the signal transfer element 11 and to the propagating member 13, and is arranged to define at least one property of an oscillating movement of the propagating member 13 in relation to the signal transfer element 11.

In this context, it should be noted that movement of the propagating member 13 in relation to the signal transfer element 11 includes movement of one or both of the propagating member 13 and the signal transfer element 11, as long as there is relative movement therebetween.

The actuator 17 is arranged to at least initiate the oscillating relative movement, between the propagating member 13 and the signal transfer element 11, i.e. to start moving at least one of the propagating member 13 and the signal transfer element 11 in relation to the tank 3. According to embodiments, a first one of the signal transfer element 11 and the propagating member 13 may remain stationary and a second one of the signal transfer element 11 and the propagating member 13 may start to move, in relation to the tank 3, when the oscillating movement is initiated by the actuator 17.

The processing circuitry 19 is coupled to the transceiver 9 and configured to determine the above-mentioned topographic property of the product 5 based on the transmit signal $S_T$ and the reflection signal $S_R$. In particular, the topographic property may be determined based on a series of timing relations between the transmit signal $S_T$ and the reflection signal $S_R$ while the above-mentioned relative oscillating movement is taking place, so that the transmit signal $S_T$ is deflected in different directions. A distance between a reference position at the radar level gauge system and the surface of the product 5 may then be determined for the different locations 7 on the surface of the product 5 mentioned above with reference to FIG. 1.

In embodiments, a position of the maximum and/or minimum may additionally be determined, and/or the surface topography may be imaged. In such embodiments, the radar level gauge system 1 may additionally comprise a position indication arrangement 24 arranged and configured to provide a signal indicative of instantaneous positions of the propagating member 13 in relation to the signal transfer element 11. As is schematically indicated in FIG. 2 by the dashed line, the position indication arrangement 24 may be coupled to the processing circuitry 19. In these embodiments, the processing circuitry 19 may be configured to determine the topographic property additionally based on the instantaneous positions of the propagating member 13 in relation to the signal transfer element 11. In particular a relative position may be acquired for each of the above-mentioned timing relations between the transmit signal $S_T$ and the reflection signal $S_R$. Based on the relative positions between the signal transfer element 11 and the propagating member 13 acquired from the position indication arrangement 24, the corresponding locations 7 on the surface of the product 5 mentioned above with reference to FIG. 1 can be determined.

In embodiments, the position indication arrangement 24 may comprise at least one accelerometer. Based on the acceleration, and a known initial position, the instantaneous positions of the moving one of the signal transfer element 11 and the propagating member 13 can be determined by simply integrating twice. The integration can take place in the accelerometer or in the processing circuitry 19.

Alternatively, the position indication arrangement 24 may comprise a sensor and a known pattern. For instance, an optical pattern may be formed on a visible surface of the moving one of the signal transfer element 11 and the propagating member 13, and a stationary image sensor, such as a CCD or CMOS camera may be used to acquire images of the optical pattern. Based on the images, the instantaneous positions can be determined. Alternatively, the pattern may be formed on a visible surface of the stationary one of the signal transfer element 11 and the propagating member 13, and the image sensor can arranged to move with the moving one of the signal transfer element 11 and the propagating member 13.

The communication from/to the radar level gauge system 1 via the communication interface 21 may be wireless communication, or may take place over an analog and/or digital wire-based communication channel. For instance, the communication channel may be a two-wire 4-20 mA loop and signals indicative of distances to the different locations 7 on the surface of the product 5 may be communicated by providing a currents corresponding to the distances on the two-wire 4-20 mA loop. Digital data may also be sent across such a 4-20 mA loop, using the HART protocol. Furthermore, pure digital communication protocols such as Modbus or Foundation Fieldbus may be used.

A first example embodiment of the radar level gauge system 1 in FIG. 1 and FIG. 2 will now be described with reference to FIGS. 3A-B.

Figure 3A:
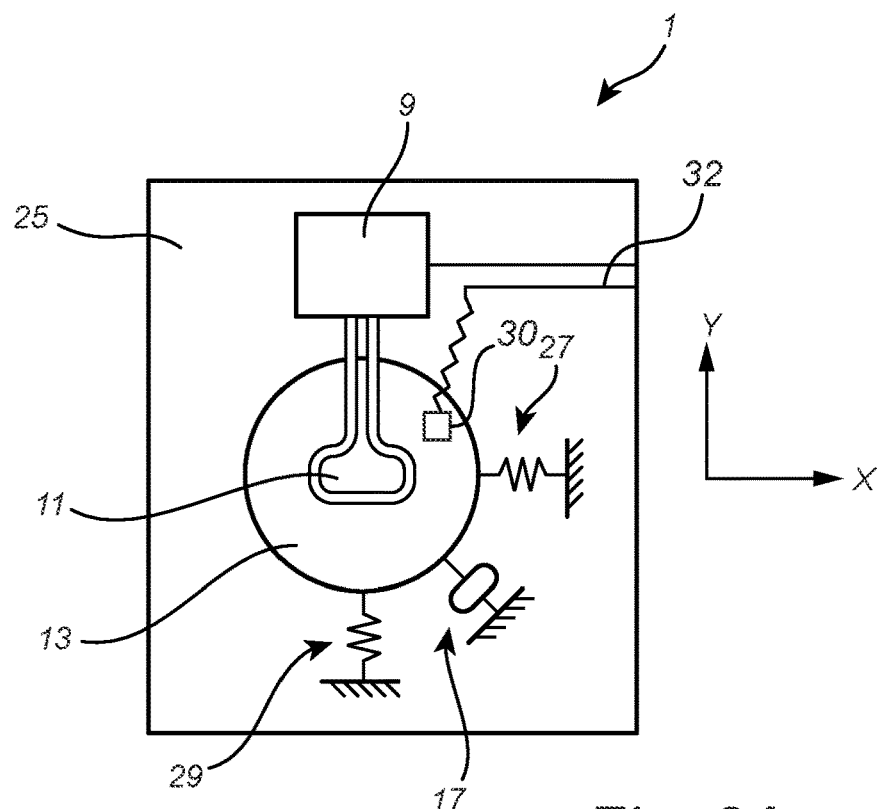
FIG. 3A is a schematic partial view of a radar level gauge system according to a first embodiment of the present invention, as seen along the emission direction.

FIG. 3A is a schematic partial view of the radar level gauge system 1 facing the product 5 as seen along the emission direction 23. In the partly structural and partly conceptual illustration in FIG. 3A, the transceiver 9 is realized as a microwave IC mounted on a carrier structure 25 in the form of a microwave circuit board, and the signal transfer element 11 comprises a patch formed in the carrier structure 25 and connected to a signal output (not shown) of the transceiver 9. The propagating member 13 is, in this example configuration, provided in the form of a microwave lens which at least partly has an ellipsoid shape.

In FIG. 3A, the elastic system is conceptually indicated as comprising a first spring element 27 and a second spring element 29. The first spring element 27 defines a first eigenfrequency woi of a first component of the oscillating movement of the propagating member 13 in relation to the signal transfer element 11 in a first direction (the x-direction in FIG. 3A), and the second spring element 29 defines a second eigenfrequency woe of a second component of the oscillating movement of the propagating member 13 in relation to the signal transfer element 11 in a second direction (the y-direction in FIG. 3A). Any elastic system for which the oscillating movement is restricted to a plane (the xy-plane) perpendicular to the emission direction 23 can be functionally represented by the first spring element 27 and the second spring element 29 in FIG. 3A.

In the example configuration in FIG. 3A, the actuator 17 is indicated as a controllable actuator that is coupled between the carrier structure 25 and the propagating member 13. It should be noted that the actuator 17 does not have to be coupled to both the carrier structure 25 and the propagating member 13 to initiate the oscillating movement, but that the actuator 17 could, for example, be coupled to the carrier structure 25 and arranged and controllable to provide impulses to the propagating member 13. Furthermore, the actuator 17 could alternatively be coupled between the elastic system 15 and a stationary structure, such as the carrier structure 25 in FIG. 3A.

In addition, FIG. 3A schematically shows an accelerometer 30 fixed to the propagating member 13, and connected to an at least partly flexible conductor 32 for providing a signal from the accelerometer 30 to the processing circuitry (not shown in FIG. 3A).

Figure 3B:
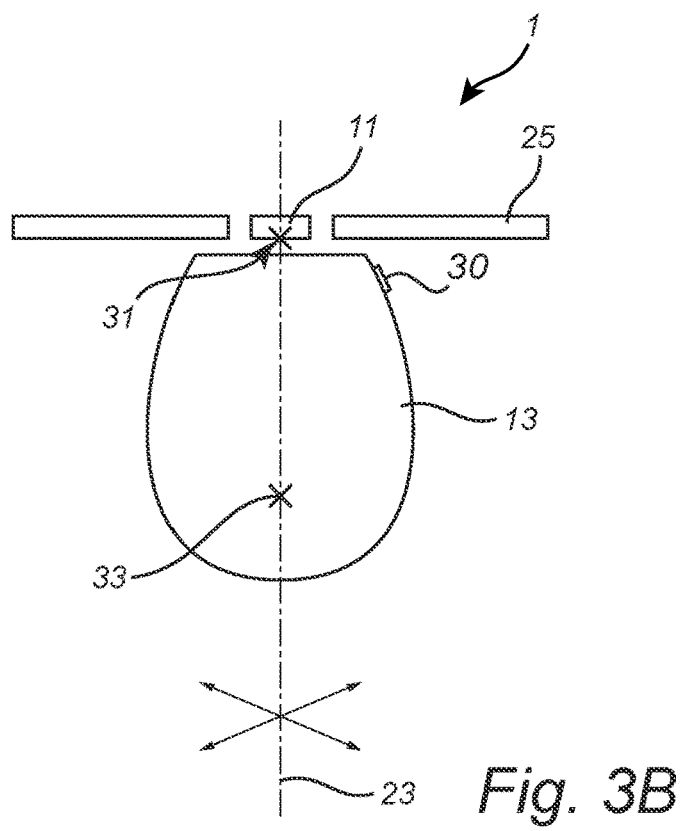
FIG. 3B is a schematic partial view of a radar level gauge system according to the first embodiment of the present invention, as seen along a direction perpendicular to the emission direction.

FIG. 3B is a simplified side view of the radar level gauge system 1 in FIG. 3B that is mainly intended to illustrate an example configuration and arrangement of the propagating member 13 in relation to the signal transfer element 11. In this example configuration and arrangement, the propagating member 13 is an ellipsoidal microwave lens with a first focal point 31 and a second focal point 33. As is schematically illustrated in FIG. 3B, the signal transfer element 11 is arranged in the first focal point 31, in the absence of the above-described relative oscillating movement.

Figure 4A:
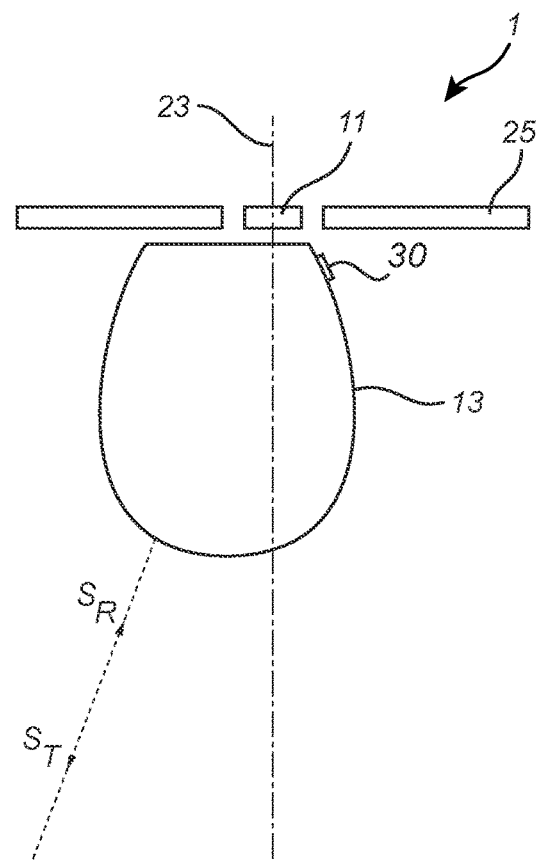
FIGS. 4A-B schematically illustrate deflection of the transmit signal for two different relative positions of the signal transfer element and the propagating member for the radar level gauge system according to the first embodiment of the present invention.
Figure 4B:
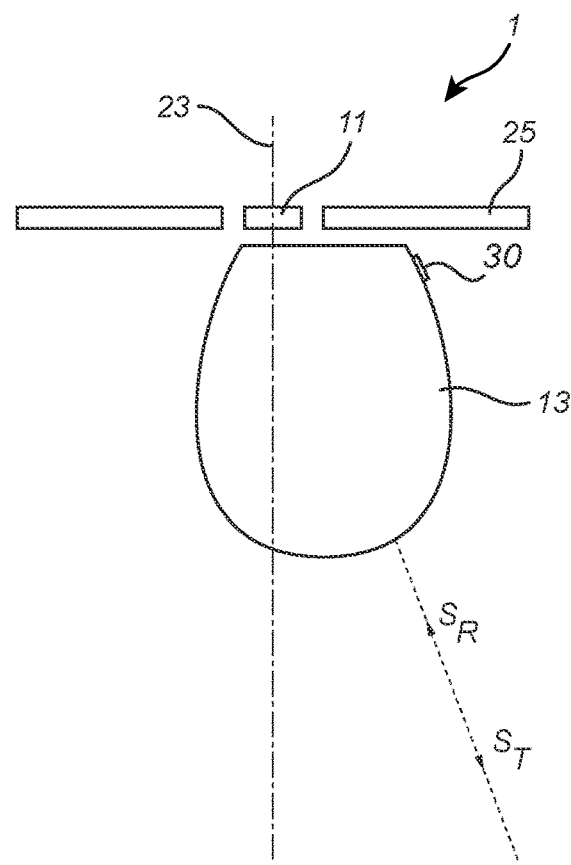

As mentioned above, the relative oscillating movement will result in deflection, in this case through refraction, of the transmit signal $S_T$ (and the reflection signal $S_R$). FIG. 4A shows the propagating member 13 being displaced to the left (and/or the signal transfer element 11 being displaced to the right) as compared to the situation in FIG. 3B, resulting in deflection of the transmit signal $S_T$ to the left in relation to the emission direction 23, so that a different location 7 on the surface of the product 5 is hit by the transmit signal $S_T$. FIG. 4B shows the propagating member 13 being displaced to the right (and/or the signal transfer element 11 being displaced to the left) as compared to the situation in FIG. 3B, resulting in deflection of the transmit signal $S_T$ to the right in relation to the emission direction 23, so that a different location 7 on the surface of the product 5 is hit by the transmit signal $S_T$.

Figure 5A:
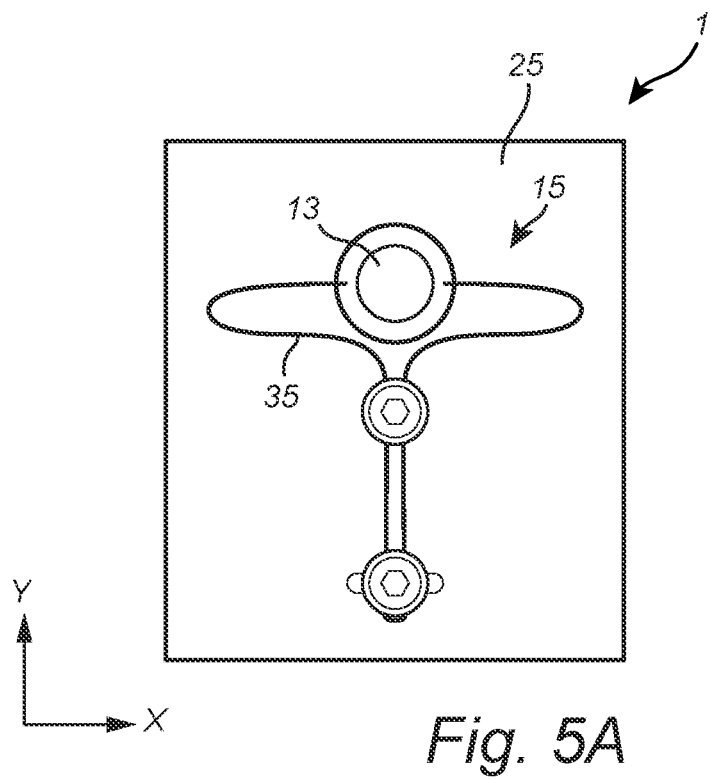
FIGS. 5A-B schematically illustrate different example configurations of the elastic system coupled to the signal transfer element and to the propagating member.
Figure 5B:
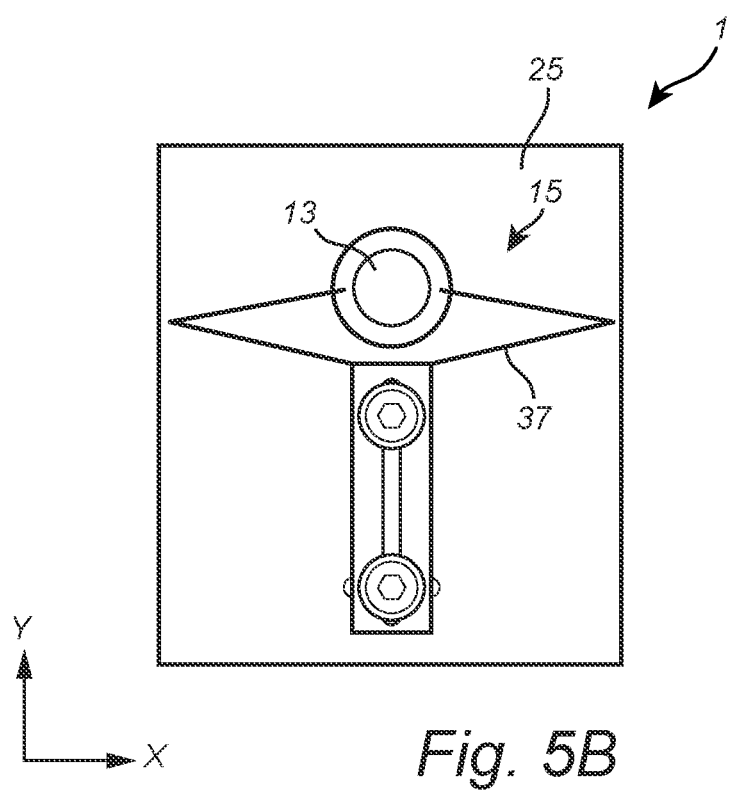

FIGS. 5A-B schematically illustrate different example configurations of the elastic system 15 coupled to the signal transfer element 11 and to the propagating member 13 in the first example embodiment of the radar level gauge system 1 described above. FIGS. 5A-B are views of the radar level gauge system 1 as seen along the emission direction 23 from the product 5 side.

In the first example configuration in FIG. 5A, the elastic system 15 comprises a spring wire 35, that is coupled to the carrier structure 25 and to the propagating member 13. The spring wire 35 is configured to define a first eigenfrequency $\omega_{01}$ of a first component of the oscillating movement of the propagating member 13 in relation to the signal transfer element 11 in a first direction (the x-direction), and a second eigenfrequency $\omega_{02}$ of a second component of the oscillating movement of the propagating member 13 in relation to the signal transfer element 11 in a second direction (the y-direction). The oscillating movement is restricted to the xy-plane by the configuration of the spring wire 35 and/or by a restricting structure (not shown in FIG. 5A).

To illustrate one of many possible alternatives to the spring wire 35 in FIG. 5A, FIG. 5B shows that the elastic system 15 instead comprises a sheet metal structure 37 that has been shaped to provide the desired properties of the oscillating movement.

Figure 6A:
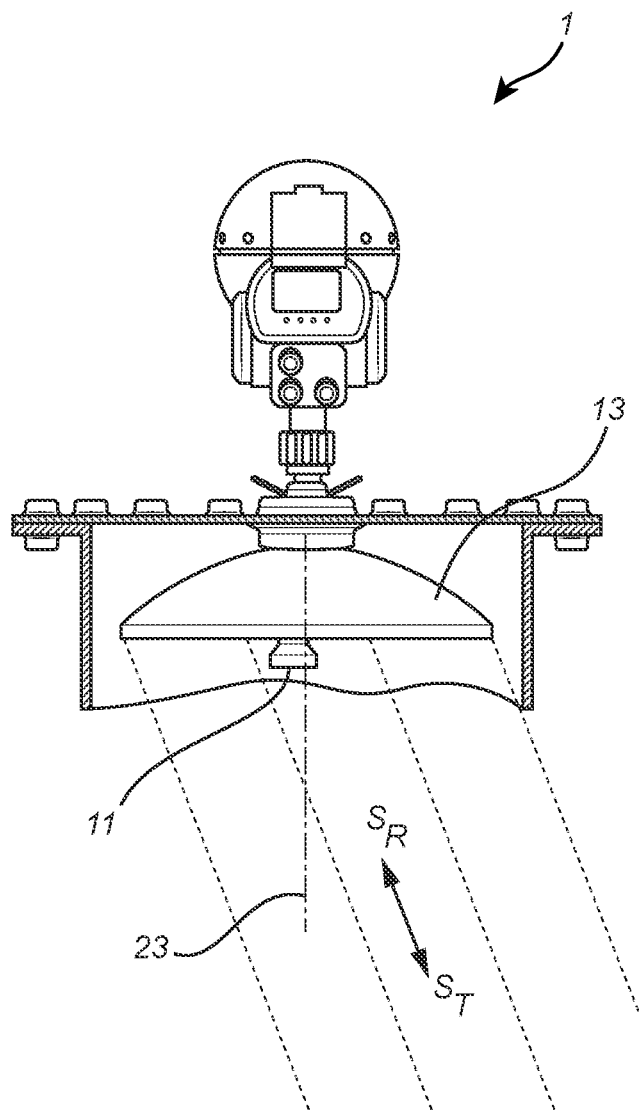
FIGS. 6A-B schematically illustrate deflection of the transmit signal for two different relative positions of the signal transfer element and the propagating member for the radar level gauge system according to a second embodiment of the present invention.
Figure 6B:
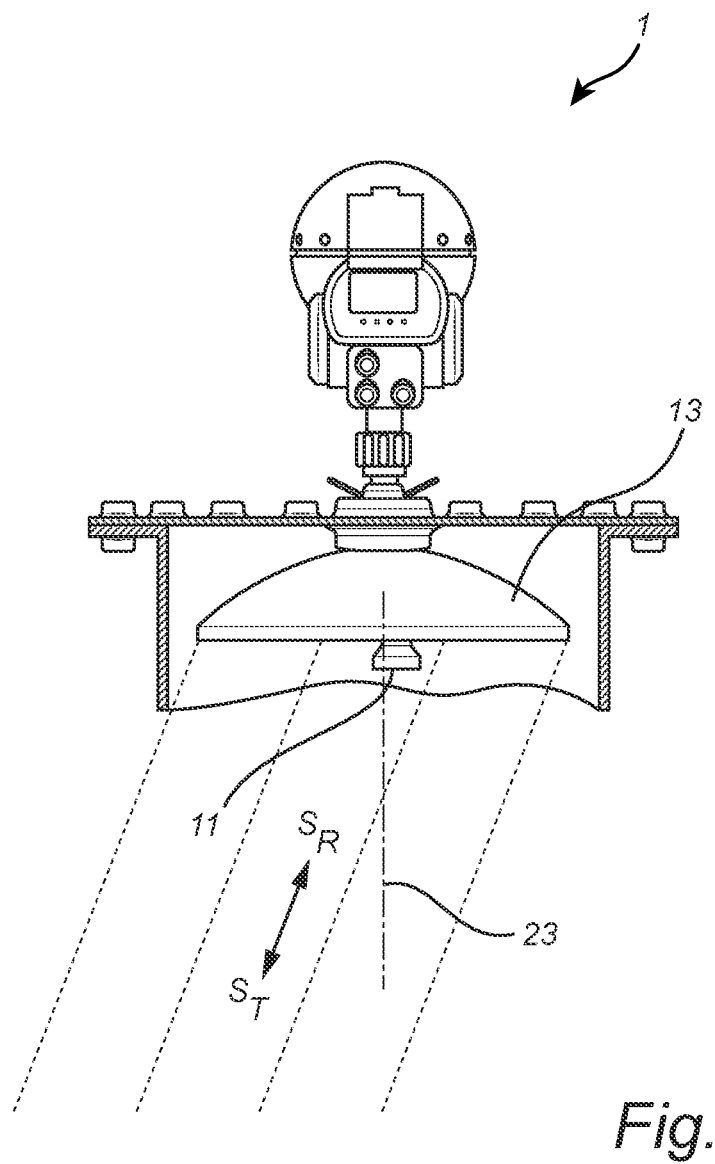

FIGS. 6A-B schematically show a radar level gauge system 1 according to a second example embodiment of the present invention, where the propagating member 13 comprises a parabolic reflector. The parabolic reflector has a focal point, and the elastic system is configured in such a way that the signal transfer element 11 is arranged in the focal point in the absence of the relative oscillating movement, when the system is at rest.

Also for this embodiment of the radar level gauge system 1, the relative oscillating movement will result in deflection, in this case through reflection, of the transmit signal $S_T$ (and the reflection signal $S_R$). FIG. 6A shows the signal transfer element 11 being displaced to the left, resulting in deflection of the transmit signal $S_T$ to the right in relation to the emission direction 23, so that a different location 7 on the surface of the product 5 is hit by the transmit signal $S_T$. FIG. 6B shows the signal transfer element 11 being displaced to the right, resulting in deflection of the transmit signal $S_T$ to the left in relation to the emission direction 23, so that a different location 7 on the surface of the product 5 is hit by the transmit signal $S_T$.

In embodiments with the basic configuration shown in FIGS. 6A-B, the radar level gauge system 1 may additionally comprise a position indication arrangement as described above. For instance, at least one accelerometer may be integrated in, or attached to, the signal transfer element 11.

Although it is indicated in FIGS. 6A-B that the signal transfer element 11 is being displaced, it could be possible to instead displace the propagation member 13, or both the signal transfer element 11 and the propagation member 13.

Figure 7A:
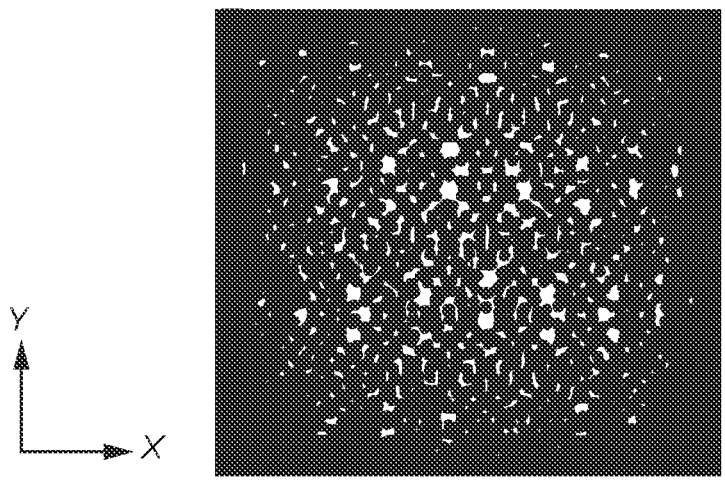
FIGS. 7A-C are simulations of scanning patterns obtainable for different configurations of the elastic system comprised in the radar level gauge system according to embodiments of the present invention.
Figure 7B:
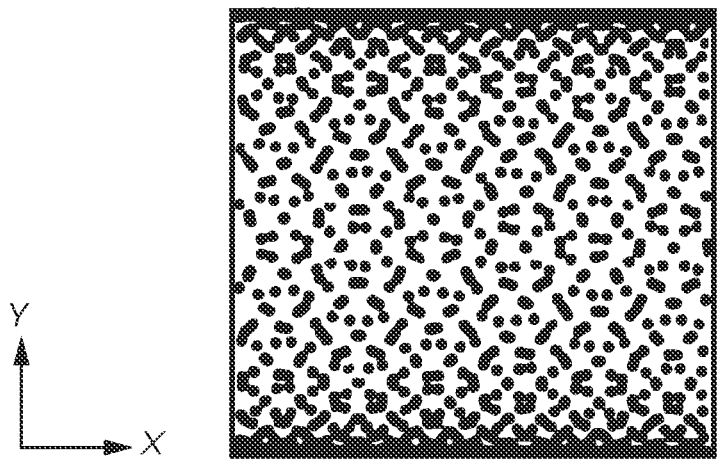
Figure 7C:
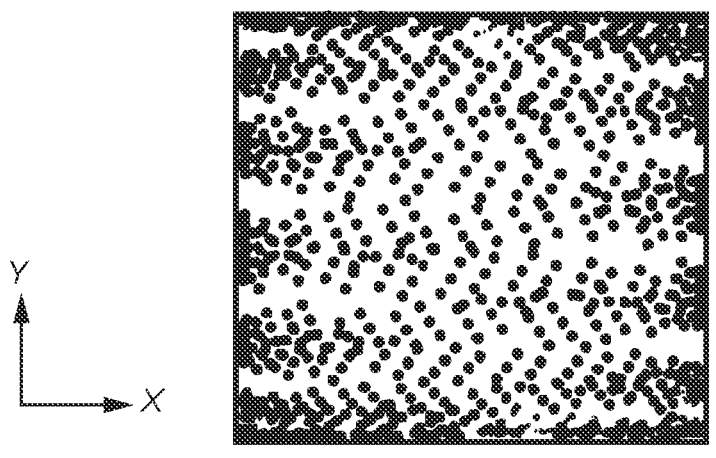

To get a desired coverage of the surface of the product 5, it may be desirable to configure the elastic system 15 to define different first $\omega_{01}$ and second $\omega_{02}$ eigenfrequencies. FIGS. 7A-C are simulations of scanning patterns obtainable for different configurations of the elastic system 15 comprised in the radar level gauge system 1 according to embodiments of the present invention. In FIG. 7A, the ratio between the first $\omega_{01}$ and second $\omega_{02}$ eigenfrequencies is 1.02, in FIG. 7B, the ratio is 1.04, and in FIG. 7C, the ratio is 1.05.

The person skilled in the art realizes that the present invention by no means is limited to the preferred embodiments described above. On the contrary, many modifications and variations are possible within the scope of the appended claims.

What is claimed is:

1. A radar level gauge system for determining a topographic property of a product, the radar level gauge system comprising:
   a transceiver for generating, transmitting and receiving electromagnetic signals;
   a signal transfer element coupled to the transceiver and configured to emit an electromagnetic transmit signal from the transceiver in an emission direction;
   a propagating member arranged and configured to propagate the transmit signal towards the surface of the product, and to propagate a reflection signal resulting from reflection of the transmit signal at the surface of the product back towards the transceiver, the propagating member being movably arranged in relation to the signal transfer element and configured to deflect the transmit signal from the signal transfer element to a plurality of different propagation directions, each propagation direction corresponding to a position of the propagating member in relation to the signal transfer element in a plane perpendicular to the emission direction;

an elastic system coupled to the signal transfer element and to the propagating member, and arranged to define at least one property of an oscillating relative movement between the propagating member and the signal transfer element in the plane perpendicular to the emission direction, the oscillating relative movement being restricted from taking place in the emission direction;

an actuator arranged to initiate the oscillating relative movement; and processing circuitry coupled to the transceiver and configured to determine the topographic property based on the transmit signal and the reflection signal.

2. The radar level gauge system according to claim 1, wherein the elastic system defines a first eigenfrequency of a first component of the oscillating movement and a second eigenfrequency, different from the first eigenfrequency, of a second component of the oscillating movement.

3. The radar level gauge system according to claim 1, wherein the elastic system comprises a first portion fixed to the signal transfer element and second portion fixed to the propagating member, and a spring element elastically connecting the first portion and the second portion.

4. The radar level gauge system according to claim 1, wherein a first one of the signal transfer element and the propagating member remains stationary and a second one of the signal transfer element and the propagating member starts to move, in relation to a tank where the radar level gauge system is installed, when the oscillating movement is initiated.

5. The radar level gauge system according to claim 4, wherein:

the radar level gauge system further comprises a position indication arrangement arranged and configured to provide a signal indicative of instantaneous positions of the propagating member in relation to the signal transfer element; and the processing circuitry is coupled to the position indication arrangement and configured to determine the topographic property additionally based on the instantaneous positions of the propagating member in relation to the signal transfer element.

6. The radar level gauge system according to claim 5, wherein the position indication arrangement comprises an accelerometer fixed to the second one of the signal transfer element and the propagating member.

7. The radar level gauge system according to claim 1, wherein the propagating member comprises a microwave lens.

8. The radar level gauge system according to claim 7, wherein the microwave lens at least partly has an ellipsoid shape.

9. The radar level gauge system according to claim 7, wherein:

the microwave lens has a focal point; and the elastic system is configured in such a way that the signal transfer element is arranged in the focal point in the absence of the oscillating movement of the propagating member in relation to the signal transfer element.

10. The radar level gauge system according to claim 1, wherein the propagating member comprises a parabolic reflector.

11. The radar level gauge system according to claim 10, wherein:

the parabolic reflector has a focal point; and the elastic system is configured in such a way that the signal transfer element is arranged in the focal point in the absence of the oscillating movement of the propagating member in relation to the signal transfer element.

12. A method of determining a topographic property of a product using a radar level gauge system comprising a transceiver; a signal transfer element coupled to the transceiver; a propagating member movably arranged in relation to the signal transfer element and configured to deflect an electromagnetic signal from the signal transfer element depending on a position of the propagating member in relation to the signal transfer element; an elastic system coupled to the signal transfer element and to the propagating member; an actuator; and processing circuitry coupled to the transceiver, the method comprising:

generating, by the transceiver, an electromagnetic transmit signal;

emitting, by the signal transfer element, the transmit signal in an emission direction;

propagating, by the propagating member, the transmit signal towards a surface of the product;

propagating, by the propagating member, a reflection signal resulting from reflection of the transmit signal at the surface of the product, back towards the transceiver;

receiving, by the transceiver, the reflection signal;

oscillating, by the elastic system and the actuator, one of the propagating member and the signal transfer member in relation to the other one of the propagating member and the signal transfer member in a plane perpendicular to the emission direction, while the transmit signal is propagated towards the surface of the product and the reflection signal is propagated back towards the transceiver; and determining, by the processing circuitry, the topographic property of the product based on a timing relation between the transmit signal and the reflection signal.

13. The method according to claim 12, wherein:

the radar level gauge system further comprises a position indication arrangement arranged and configured to provide a signal indicative of instantaneous positions of the propagating member in relation to the signal transfer element;

the method further comprises the step of acquiring the signal indicative of instantaneous positions of the propagating member in relation to the signal transfer element; and the topographic property is determined additionally based on the instantaneous positions of the propagating member in relation to the signal transfer element.

* * * * *